US008175586B2

(12) United States Patent
Li (10) Patent No.: US 8,175,586 B2
(45) Date of Patent: May 8, 2012

(54) METHOD FOR IMPLEMENTING ONE CARD MULTI-NUMBER SERVICE

(75) Inventor: Shiqian Li, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1332 days.

(21) Appl. No.: 11/766,859

(22) Filed: Jun. 22, 2007

(65) Prior Publication Data

US 2008/0002816 A1 Jan. 3, 2008

Related U.S. Application Data

(63) Continuation of application No. PCT/CN2005/002279, filed on Dec. 22, 2005.

(30) Foreign Application Priority Data

Dec. 22, 2004 (CN) .......................... 2004 1 0101760

(51) Int. Cl.
*H04M 3/42* (2006.01)
(52) U.S. Cl. ....................................... 455/415
(58) Field of Classification Search .................... 455/415
See application file for complete search history.

(56) References Cited

U.S. PATENT DOCUMENTS 5,924,027 A 7/1999 Valentine et al.
5,983,095 A * 11/1999 Cameron ...................... 455/417
7,627,533 B2 * 12/2009 Kokko ............................. 705/74
2004/0229601 A1 11/2004 Zabawskyj et al.

FOREIGN PATENT DOCUMENTS

| CN | 1411314 | 4/2003 |
| CN | 1476272 | 2/2004 |
| CN | 1477804 (A) | 2/2004 |
| CN | 1518383 | 8/2004 |
| WO | WO 98/23113 | 5/1998 |

OTHER PUBLICATIONS

International Search Report, PCT/CN2005/002279, dated Mar. 30, 2006, 4 pages.
Written Opinion of the International Searching Authority, PCT/CN2005/002279, dated Mar. 30, 2006, 6 pages.

* cited by examiner

*Primary Examiner* — Marisol Figueroa
(74) *Attorney, Agent, or Firm* — Slater & Matsil, L.L.P.

(57) ABSTRACT

Embodiments of the present invention disclose a method for implementing a One Card Multiple-Number (OCMN) service, which includes: establishing a mapping relation between an internal network number of a user and at least one external number of the user; determining an internal network number of a called user corresponding to an external number of the called user according to the mapping relation when a calling user initiates a call to the external number of the called user; connecting the call to the called user according to the internal network number of the called user. Embodiments of the present invention further disclose a system. According to the embodiments of the present invention, the OCMN service may be implemented flexibly.

17 Claims, 3 Drawing Sheets

Fig. 3

METHOD FOR IMPLEMENTING ONE CARD MULTI-NUMBER SERVICE

FIELD OF THE INVENTION

The present invention relates to communication technologies, and more particularly, to a method and a system for implementing a One Card Multi-Number (OCMN) service.

BACKGROUND OF THE INVENTION

The OCMN service represents that one user corresponds to multiple numbers, i.e., one user binds multiple external numbers. The terminal of the user will ring when another user dials any of the multiple numbers, so that the current call is connected between the calling user and the called user. Alternatively, the user as a calling user may select one of the multiple external numbers as demanded to display to the called user.

It is necessary to spread the OCMN service for the reason that an OCMN service user as a called user may be close to a calling user. For example, a counterman of a company takes charge of businesses at Places A, B and C. If the counterman is located at Place A and his contact phone belongs to Place A, customers at Place A will contact the counterman more frequently while customers at Places B and C will contact the counterman rarely. On one hand, customers at Places B and C would not like to pay for a long distance call; on the other hand, customers at Places B and C may not be permitted to dial a long-distance phone number, e.g., in some companies, most employees have no right for dialing a long-distance phone number. In this case, the counterman desires that customers at any place may feel that the counterman is located locally. The OCMN service may meet such requirement of the counterman, i.e., the counterman may set a corresponding relation between his numbers of other places and his local number, and binds the numbers of other places and the local number to one terminal, which makes customers at other places feel that the counterman is close to them and the call seems in one place.

When the OCMN service user is a calling user, it is unnecessary to pay for a long distance call as long as the user dials a called number using one of multiple numbers which belongs to the same place with the called number. Alternatively, when the user initiates a call at a place to which any of the multiple numbers belongs, it may be considered that the user is in a non-roaming state, in this way, user call cost may be saved greatly.

However, there is no detailed implementation solution for the above OCMN service.

SUMMARY OF THE INVENTION

Embodiments of the present invention provide a method and system for implementing a One Card Multiple-Number (OCMN) service.

A method for implementing a One Card Multiple-Number (OCMN) service includes: establishing a mapping relation between an internal network number of a user and at least one external number of the user;

determining an internal network number of a called user corresponding to an external number of the called user according to the mapping relation when a calling user initiates a call to the external number of called user;

connecting the call to the called user according to the internal network number of the called user.

A system for implementing a One Card Multiple-Number (OCMN) service includes:

a number association unit, configured to store a mapping relation between an internal network number of a user and at least one external number of the user, receive a call from the calling user, determine an internal network number of a called user corresponding to an external number of the called user according to the mapping relation, and connect the call to the called user according to the internal network number of the called user.

A method for implementing a One Card Multiple-Number (OCMN) service includes:

establishing a mapping relation between an internal network number of a user and at least one external number of the user;

determining an external number of a calling user corresponding to an internal network number of the calling user according to the mapping relation when the calling user initiates a call to a called user;

connecting the call to the called user.

The method and system proposed by the embodiments of the present invention may implement the OMCN service. When the OCMN service user is a calling user, it is unnecessary to pay for a long distance call as long as the user dials a called number using one of the multiple numbers which belongs to the same place with the called number. Alternatively, when the user initiates a call at a place to which any of the multiple numbers belongs, it may be considered that the user is in a non-roaming state, so that the operator may not charge for this call or provide a flexible charging rate for this call, which may save user phone fees greatly. When another user initiates a call to the OCMN service user, the bill of the long distance call will not be generated as long as the user calls one of the multiple numbers which belongs to the same place with the calling number, in this way, the operator may not charge this call or provide a flexible charging rate for this call, which may save phone fees of other users.

DETAILED DESCRIPTION OF THE INVENTION

The embodiments of the present invention are hereinafter described in detail with reference to the accompanying drawings.

The embodiments of the present invention disclose a method for implementing a One Card Multiple-Number (OCMN) service, which includes: establishing a mapping relation between an internal network number of a user and more than one external number of the user; when a calling user initiates a call to a called user, determining an internal network number corresponding to an external number of the called user according to the mapping relation, and connecting the call to the called user according to the internal network number. The internal network number described in the embodiments of the present invention comprises a Mobile Directory Number (MDN), International Mobile Subscriber Identity (IMSI), and Mobile Identity Number (MIN) and so on, and each user usually has one internal network number and more than one external number. "More than one" described in the embodiments of the present invention is directed to "one or more".

In the embodiments of the present invention, an OCMN service user binds not only one or more external numbers, denoted by n1, n2, n . . . nM, but also one internal network number, denoted by n0. When a call is processed inside a network, one or more external numbers of a user are bound with an identity of an internal network number of the user. Moreover, the mapping relation between each external number and the internal network number is established so as to add, delete or modify external numbers of the OCMN service user at any moment without the change of the internal network number, which only requires resetting the mapping relation between each external number and the internal network number. Therefore the OCMN service will not be influenced. In addition, the internal network number may be one of the external numbers or a number different from the external numbers. As a result, the internal network number set individually may make the external numbers independent on an actually connected number in a call, and the actually connected number is the internal network number, so that the OCMN service user may replace terminal conveniently as required without changing external number. For example, Counterman A sets his external numbers n1, n2 and n3 at Places A, B and C respectively, and the internal network number is n0a which belongs to Place A. Later, Counterman A moves from Place A to Place B, so n0a is replaced with n0b which belongs to Place B for convenience. If the internal network numbers n0a and n0b are different from the external numbers n1, n2 and n3, the external numbers n1, n2 and n3 are not impacted when the internal network number is changed, so that the user may change the internal network number conveniently as required. When being one of the external numbers, the internal network number may change dynamically according to the external number activated currently.

A number association unit for saving the mapping relation between the internal network number and the external numbers may be set individually. A home switch unit of the calling user first triggers a call to the number association unit, and then the number association unit determines an internal network number corresponding to an external number of the called user in the call, and connects the call to a home switch unit of the internal network number. The home switch unit of the internal network number connects the call to the called user.

In the method according to the embodiments of the present invention, when the OCMN service user is a called user, a call should be connected to the OCMN service user according to the internal network number of the called user. When the OCMN service user is a calling user, a certain external number of the calling OCMN service user should be displayed to the called user. With respect to FIG. 1 and FIG. 2, the processing procedure is hereinafter described in which the OCMN service user is a called user and a calling user respectively.

Figure 1:
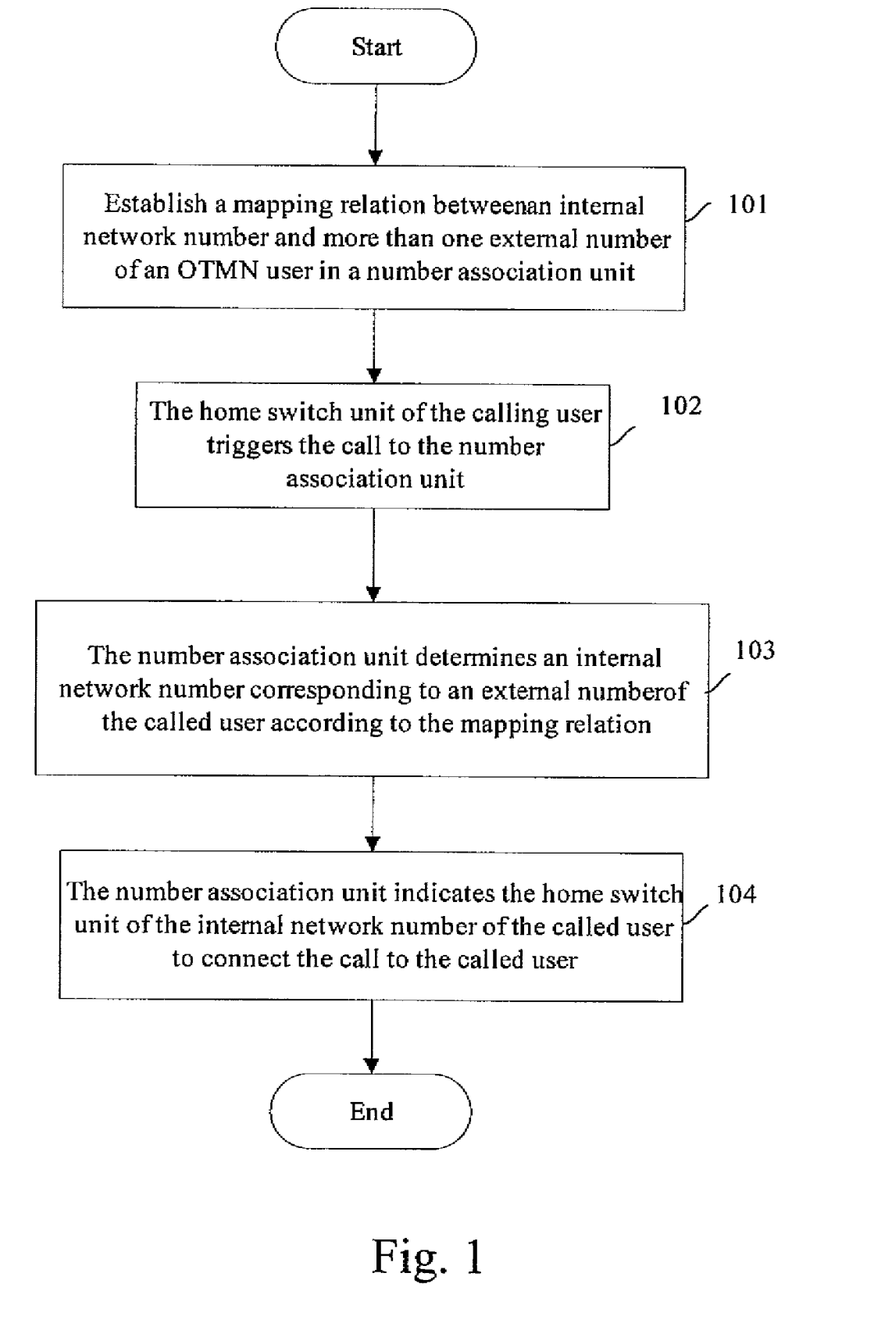
FIG. 1 is a simplified flowchart of implementing an OCMN service in which an OCMN service user is a called user in accordance with an embodiment of the present invention.

FIG. 1 is a simplified flowchart of implementing an OCMN service in which an OCMN service user is a called user in accordance with an embodiment of the present invention. In this embodiment, the mapping relation between the internal network number and external numbers of an OCMN service user is set in a number association unit. Referring to FIG. 1, the specific processing is as follows.

Step 101: Establish the mapping relation between an internal network number of an OCMN service user and more than one external number of the OCMN service user in a number association unit.

Step 102: When a calling user initiates a call, a home switch unit of the calling user triggers the call to the number association unit. The call carries a calling user number and a called user number, and the calling user number is usually the internal network number of the calling user while the called user number is an external number of the called user dialed by the calling user.

In a conventional call connection procedure, it is through the switch units of the calling user and the called user to connect a current call, so as to connect the current call to the called user eventually. In the embodiments of the present invention, the call connection procedure of the switch units is the same as the conventional call connection procedure, and will not be further described herein.

Step 103: The number association unit determines the internal network number corresponding to the external numbers of the called user according to the received external number of the called user and the mapping relation established in Step 101.

Step 104: The number association unit indicates the home switch unit of the calling user to connect the call to the home switch unit of the internal network number of the called user, i.e., the actual home switch unit of the called user. The home switch unit of the calling user changes the external number of the called user in the current call to the internal network number of the called user, and connects the call to the home switch unit of the internal network number of the called user. The home switch unit of the called user connects the call to the called user so that the call may be established between the calling user and the called user.

Figure 2:
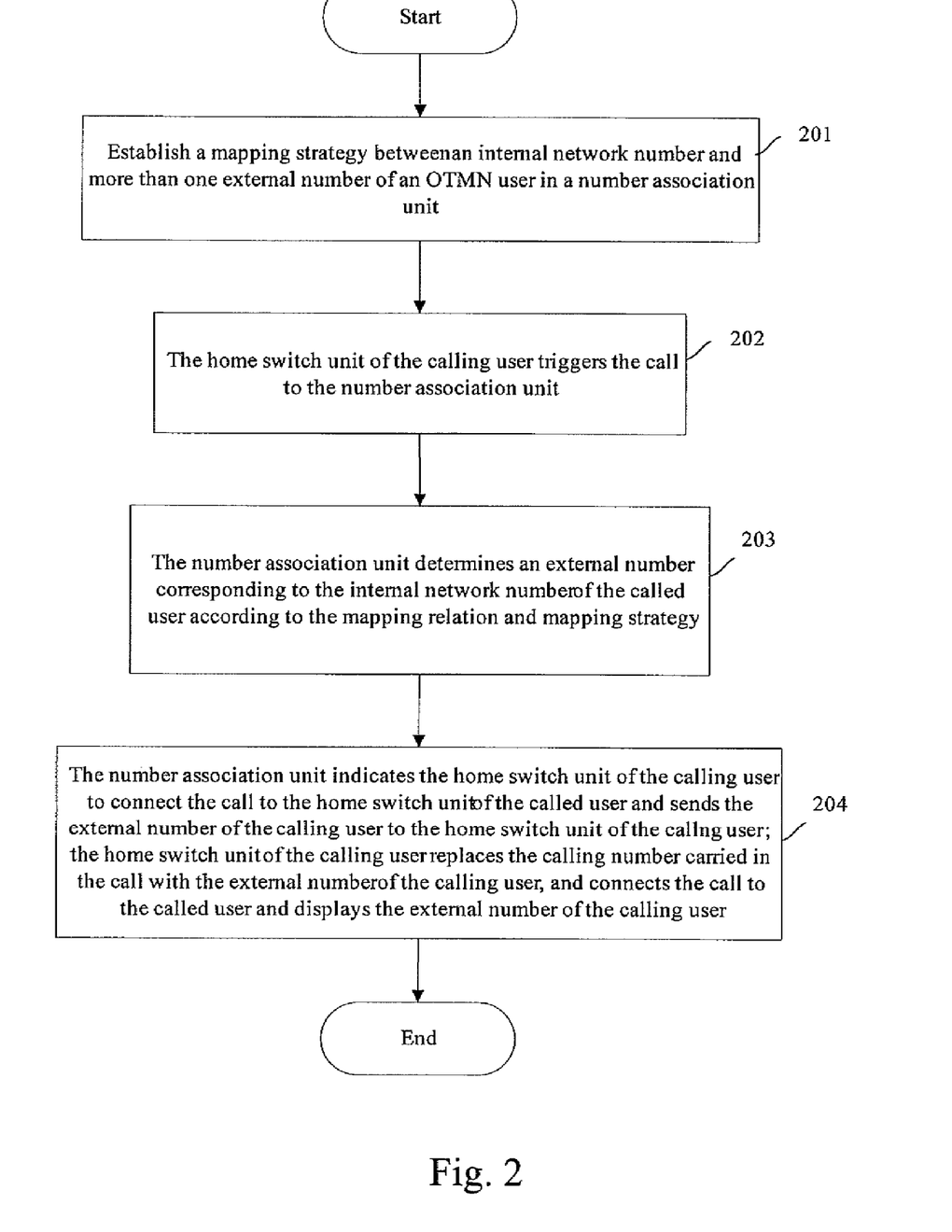
FIG. 2 is a simplified flowchart of implementing an OCMN service in which an OCMN service user is a calling user in accordance with an embodiment the present invention.

FIG. 2 is a simplified flowchart of implementing an OCMN service in which an OCMN service user is a calling user in accordance with an embodiment of the present invention. In this embodiment, the mapping relation between the internal network number of an OCMN service user and the external numbers of the OCMN service user is set in a number association unit. When an OCMN service user is a calling user, it may be necessary to display an external number of the calling user to the called user, a mapping strategy between an internal network number and more than one external number should also be established. Referring to FIG. 2, the specific processing is as follows.

Step 201: Establish the mapping relation and the mapping strategy between the internal network using number of an OCMN service user and more than one external number of an OCMN service user in a number association unit.

For an OCMN service user, one internal network number may correspond to multiple external numbers, and the mapping strategy determines an external number corresponding to the internal network number currently used according to the current calling/called user information. For example, the internal network number n0 of User 1 corresponds to external numbers n1, n2 and n3 of User 1 at Places A, B and C. When a user called by User 1 is located at Place A, the external number n1 of User 1 at Place A may need to be displayed. When the user called by User 1 is located at Place C, the external number n3 of User 1 at Place C may need to be displayed. As a result, the mapping strategy may be set as a mapping relation between the calling/called user information and the external numbers. The calling/called user information generally includes the current location of the calling user, the current location of the called user, the input information of the calling user, e.g., when initiating a call, the calling user inputs numeral "1" to direct displaying the external number n1 and inputs numeral "2" to direct displaying the external number n2. The calling/called user information may also be any combination of the above information. The detailed mapping rules defined by the mapping strategy are not limited in the embodiments of the present invention, and any rule may be regarded as the mapping strategy described in the embodiments of the present invention as long as an external number may be acquired according to the internal network number.

Step 202: When a calling user initiates a call, the home switch unit of the calling user triggers the call to a number association unit.

The call carries a calling user number and a called user number, and the calling user number is usually the internal network number of the calling user while the called user number is an external number of the called user dialed by the calling user.

Step 203: The number association unit determines more than one external number corresponding to the internal network number of the calling user according to the internal network number of the calling user in the call and the mapping relation between the internal network number and more than one external number, and determines an external number corresponding to the internal network number of the calling user according to more than one external number of the calling user and the mapping strategy.

As shown in Step 201, the mapping strategy is generally a mapping relation between the calling/called user information and more than one external number. Therefore, in this step, the number association unit may determine an external number corresponding to the calling/called user information according to the more than one external number corresponding to the internal network number of the calling user, the calling/called user information and the mapping relation.

In addition, in this step, if the called user is also an OCMN service user, the number association unit needs to determine the internal network number corresponding to the external number of the called user in the call according to the method described in Step 103.

Step 204: The number association unit indicates the home switch unit of the calling user to connect the call to the home switch unit of the called user number and sends the determined external number of the calling user to the home switch unit of the calling user. The home switch unit of the calling user replaces the internal network number of the calling user carried in the call with the received external number of the calling user, and connects the call carrying the external number of the calling user to the home switch unit of the called user number. The home switch unit of the called user number connects the call to the called user to display the external number of the calling user.

The called user may be an OCMN service user or a common user. If the called user is an OCMN service user, the called user number is the internal network number of the called user determined by the number association unit in Step 203. If the called user is a common user, the called user number is an actual called user number in the common call connection procedure.

The home switch unit of the calling user, the home switch unit of the calling user number and the home switch unit of the calling user are directed to one entity in the embodiments of the present invention, and the home switch unit of the called user, the home switch unit of the called user number and the home switch unit of the called user are also directed to one entity.

In the above embodiments, the number association unit may be a Service Control Point (SCP) or a Home Location Register (HLR). When the number association unit is an SCP and an HLR respectively, the processing procedure of the method according to the embodiments of the present invention is different. The detailed processing procedure is further described hereinafter by examples in which the number association unit is an SCP and an HLR respectively.

For an example, the number association unit is an SCP. In this example, the switch unit may be a Service Switch Point (SSP).

When an OCMN service user initiates a call as a calling user, the processing procedure is as follows.

If the calling number needs to be displayed, the calling user triggers the OCMN service to the SCP as the number association unit over the home SSP of the internal network number of the calling user. If the calling number does not need to be displayed or changed, it is unnecessary to trigger the OCMN service to the SCP, i.e., perform the OCMN service like a common call.

When the OCMN service is triggered to the SCP as the number association unit, the SCP searches, according to the mapping strategy, the mapping relation between the internal network number of the calling user and more than one external number of the calling user, and determines an external number of the calling user to be displayed, which is one of more than one external number corresponding to the internal network number of the calling user.

The SCP delivers the external number of the calling user to be displayed to the home SSP of the calling user. After receiving the external number of the calling user to be displayed, the SSP changes the calling user number in the call from the internal network number to the external number of the calling user.

At last, the home SSP of the calling user connects the call carrying the external number of the calling user to the called user over the home SSP of the called user, so that the external number of the calling user may be displayed to the called user.

The external number of the calling user to be displayed may be carried in a parameter of an original request (orreq) message, e.g., CallingPartyNumberString1. In addition, if the calling user number does not need to be displayed in the call, it is needless for the SSP to trigger the call to the SCP, so that the SCP does not need to determine the external number of the calling user. In this way, the SSP does not need to change the calling user number from the internal network number to the external number.

The SCP may determine, according to an area in which the call is initiated, that the external number of the calling user to be displayed is an external number of the calling user belonging to the area. For example, the internal network number n0 binds the external numbers n1, n2 and n3 which belong to Places A, B and C respectively. If a user initiates a call at Place B, the external number needing to be displayed is an external number of the calling user belonging to Place B., Therefore the SCP may select n2 as the external number of the calling user needing to be displayed. The external number of the calling user to be displayed may be an external number belonging to an area to which the called user number belongs, or an external number determined by the SCP according to the input information of the calling user. For example, if the calling user inputs prefix information, e.g., "*01#" before dialing the called user number, the SCP determines, according to the mapping relation, a first external number corresponding to the internal network number as the external number of the calling user needing to be displayed in this call.

When an OCMN service user is a called user, the processing procedure is as follows.

Since multiple external numbers of a user may be managed by one SCP or managed by different SCPs, the processing in different cases are hereinafter described respectively. The mentioned SCP herein may be the same as or different from the home SCP of the internal network number. When multiple external numbers of a user are managed by one SCP, a termination trigger is set for each external number, e.g., an Initial_Termination trigger in a Code Division Multiple Access (CDMA) network, and the address of the termination trigger is the address of the SCP as the number association unit, so that the call may be triggered to the SCP. If the calling user number and the called user number belong to one network architecture or one operator, e.g., a CDMA communication network, the home SSP of the calling user number triggers the call to the SCP over the termination trigger. When the calling user number and the called user number belong to one operator but different network architecture, if the SCP is an integrated SCP supporting the signaling processing in various network architecture, the home SSP of the calling user number may trigger the call to the SCP over the termination trigger; otherwise, process the call according to a method in which the calling user number and the called user number belong to different operators. If the calling user number and the called user number belong to different network architecture or different operators, e.g., the calling user number belongs to a Public Switch Telephone Network (PSTN) while the called umber belongs to a Global System for Mobile communication (GSM) network, the home switch unit of the calling user number connects the call to a gateway switch unit between the home network of the calling user number and the home network of the called user number. The gateway switch unit connects the call to the SSP in the home network of the called user number, and the SSP triggers the call to the SCP over the termination trigger.

After the call is triggered to the SCP, the SCP searches for an internal network number corresponding to the external number of the called user, changes the called user number from the external number to the internal network number, and indicates the home SSP of the calling user number to connect the call to the home SSP of the internal network number of the called user, and the home SSP of the internal network number of the called user connects the call to the called user. The above termination trigger may be an Initial_Termination trigger or a number segment trigger.

When multiple external numbers of a user are managed by different SCPs, a call-forward service is set in the home network of the multiple external numbers to forward a call to a relevant SSP, so that the call may be triggered to the SCP as the number association unit. The home switch unit of the calling user number connects the call to the home switch unit of the external number of the called user. The switch unit connects the call to a relevant SSP according to a preset call-forward number which may be a combination of prefix and the called user number, e.g., the combination of 17777 and a Mobile Directory Number (MDN), in this case, the called user number is an external number. The SSP triggers an OCMN service call to an SCP corresponding to the prefix according to the prefix, and the SCP searches for an internal network number corresponding to the external number of the called user according to the external number of the called user, changes the called user number from the external number to the internal network number, and indicates the SSP to connect the call to the home switch unit of the internal network number, and the switch unit connects the call to the called user.

If various internal network numbers belong to different SCPs, different prefixes may be set to correspond to different SCPs, so that the SSP may trigger an OCMN service call to the home SCP of the internal network number of the called user according to the prefix. Since the call-forward service is necessary for processing in the internal network, the call-forward service may not generate bill according to the prefix or the bill generated by the call-forward may be paid by the operator.

The above prefix may include a service key and routing information. The service key is used for identifying the current service such as an OCMN service, and the routing information is used for identifying the address of the SCP. The function of prefix is enhanced by combining the service key with the routing information. For example, if various internal network numbers belong to different SCPs, the service key may determine whether the current service is an OCMN service, and the current service may be routed to a relevant SCP according to the routing information.

The above switch unit implemented by the SSP may also be a Mobile Switch Center (MSC) or a switch in a fixed communication network.

For another example, the number association unit is an HLR.

The switch unit may be an MSC, a switch in a fixed communication network or an SSP.

When an OCMN service user initiates a call as a calling user, the processing procedure is as follows.

The home switch unit of the internal network number of the calling user triggers an OCMN service to the HLR as the number association unit. If an external number of the calling user needs to be displayed, the HLR searches the mapping relation between the internal network number of the calling user and more than one external number of the calling user, determines, according to the mapping strategy, the external number of the calling user needing to be displayed, delivers the external number of the calling user needing to be displayed to the home switch unit of the calling user, and indicates the home switch unit of the calling user to connect the call to the home switch unit of the called user number. After receiving the external number of the calling user needing to be displayed, the home switch unit of the calling user changes the calling user number in the F call from the internal network number to the external number of the calling user needing to be displayed, and sends the external number of the calling user needing to be displayed to the home switch unit of the called user number. The home switch unit of the called user number connects the call to the called user, so as to display the external number of the calling user to the called user. When being delivered to the home switch unit of the calling user by the HLR, the external number of the calling user needing to be displayed may be carried in a parameter of an original request (orreq) message, e.g., CallingPartyNumberString1.

If the calling user number does not need to be displayed or a default user number for displaying is delivered when a user registers, the current call does not need to be triggered to the HLR to change the calling user number, so that it is unnecessary for the HLR to determine the external number of the calling user. In this way, the home switch unit of the calling user does not need to change the calling number from the internal network number to the external number.

The method for the HLR determining the external number of the calling user needing to be displayed according to the mapping strategy is the same as that for the SCP, and will not be further described herein.

When an OCMN service user initiates a call as a calling user, the processing procedure is as follows.

Since multiple external numbers of a user may be managed by one HLR or different HLRs, the processing in different cases are hereinafter described respectively. The mentioned home HLR of the external number of a user herein may be the same as or different from the home HLR of the internal network number of the user.

When multiple external numbers of a user belong to one HLR, since multiple external numbers have been stored in the HLR as subscription data while a user subscribes to an OCMN service, the HLR may determine that the called user number is one of multiple external numbers of the called user, further determine the internal network number corresponding to the external number, and provide the home switch unit of the internal network number of the called user with the internal network number corresponding to the external number to connect a call. The home switch unit of the internal network number of the called user connects the call to the called user.

When external numbers of a user are managed by different HLRs, a call-forward is set in the home network of each external number to forward a call to a relevant SSP, so that the call may be triggered to the home HLR of the internal network number. For example, if the internal network number is a number in a special number segment, the call-forward number may be set as the internal network number. If the internal network number is not a number in the special number segment, the call-forward number may be set as the combination of the prefix and the external number of the called user, e.g., the combination of 17777 and a Mobile Directory Number (MDN) of the called user number. The prefix may be a service key. When the calling user calls one of multiple external numbers of the called user, the home switch unit of the calling user number connects the call to a switch unit in the home network of the external number of the called user. The switch unit triggers the call to the HLR corresponding to the internal network number or the HLR corresponding to the prefix of the call-forward number in the call. The HLR determines the internal network number of the called user according to the external number of the called user, changes the called user number in the call from the external number to the internal network number, and indicates the home switch unit of the calling user number to connect the call to the home switch unit of the internal network number of the called user. The home switch unit of the internal network number of the called user connects the call to the called user according to the internal network number of the called user.

The above prefix may include a service key and routing information. The service key is used for identifying the current service such as an OCMN service, and the routing information is used for identifying the address of the HLR. The function of the prefix is enhanced by combining the service key with the routing information. For example, if various internal network numbers belong to different HLRs, the service key may determine whether the current service is an OCMN service, and the current service may be routed to a relevant HLR according to the routing information.

In addition, a user may set function information of each external number while subscribing to an OCMN service, e.g., set the external number n2 as a fax number. Therefore, when an OCMN service user initiates a call using the external number as a fax number or initiates a call to the external number as a fax number, the HLR may determine, according to the subscription information of the OCMN service user, that the current service is a fax service, and the MSC may be required to improve the fax success rate. In this case, the HLR needs to provide the MSC with a fax service identity while obtaining a roaming number, and then the serving MSC connects the call according to a fax service, which is different with the common call.

Based on the above method, the embodiments of the present invention provide a system for implementing a One Card Multiple-Number (OCMN) service, which includes a calling user terminal and a called user terminal. The system further includes a number association unit for saving a preset mapping relation between an internal network number of a user and more than one external number of the user, receiving a call from the calling user, determining an internal network number corresponding to an external number of the called user according to the mapping relation, and connecting the call to the called user according to the internal network number.

The number association unit further stores a mapping strategy between an internal network number of a user and more than one external number of the user, determines an external number corresponding to an internal network number of the calling user according to the mapping strategy, and sending the external number to the called user. The number association unit includes: a mapping information storing module for saving the mapping relation and mapping strategy and a number resolving module for determining the external number of the calling user and the internal network number of the called user, so as to connect a call to the called user and display the external number of the calling user.

In the related art, the calling user and the called user may be connected over their respective home switch unit. In order to make a smallest change for the conventional connection procedure and reduce the complexity of implementing the number association unit, the system may further include a home switch unit of the calling user and a home switch unit of the called user to assist the number association unit to perform a call connection.

Figure 3:
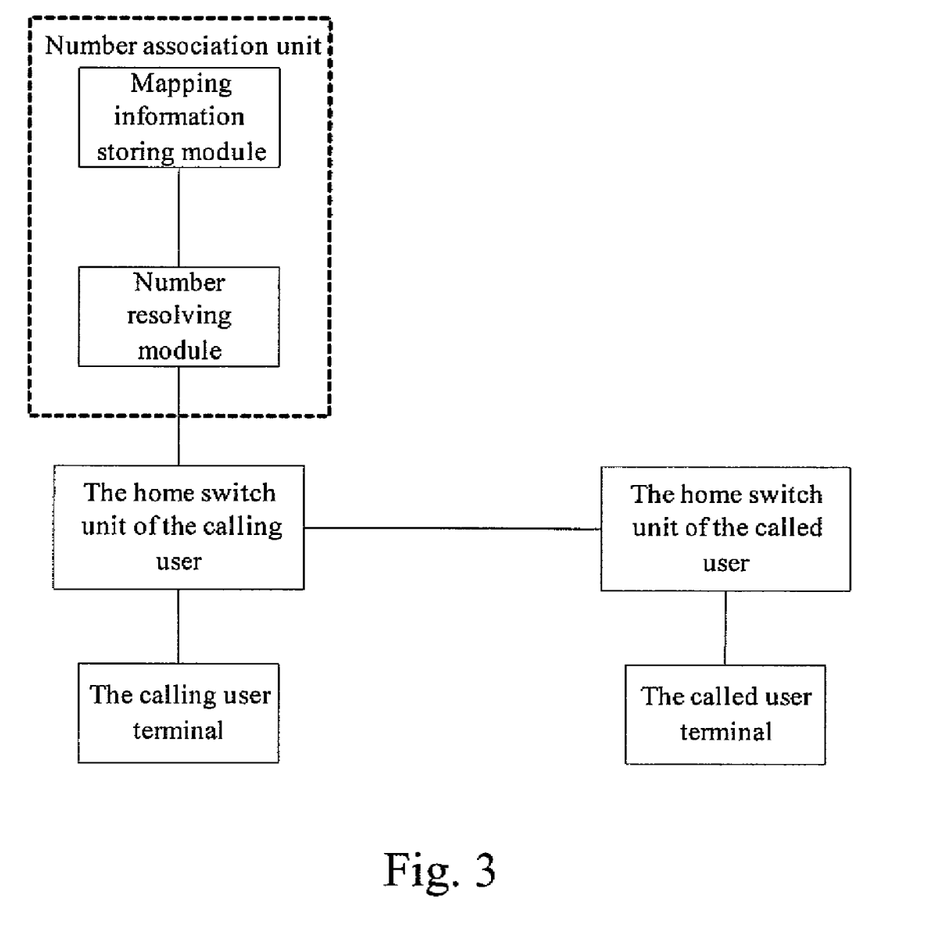
FIG. 3 is a simplified schematic diagram illustrating the structure of a system for implementing an OCMN service in accordance with an embodiment of the present invention.

FIG. 3 is a simplified schematic diagram illustrating the structure of a system for implementing an OCMN service in accordance with an embodiment of the present invention. The system in this embodiment includes: a switch unit, a user terminal and a number association unit. The number association unit connects to the switch unit, and the switch unit connects with a user terminal managed by the switch unit. For convenience, the function of each entity in the system may be described by an example in which a call is connected between the calling user and the called user. The embodiment includes a calling user terminal, a home switch unit of the calling user, a number association unit, a called user terminal and a home switch unit of the called user. The number association unit includes a number resolving module and a mapping information storing module. The calling user triggers the call to the home switch unit of the calling user, and the home switch unit of the calling user is used for triggering the call to the number resolving module of the number association unit. The number resolving module is used for resolving the call to get the internal network number of the calling user and the external number of the called user and searching the mapping information storing module according to the internal network number of the calling user and the external number of the called user, searching the mapping information storing module to get the external number of the calling user and the internal network number of the called user, delivering the external number of the calling user and the internal network number of the called user to the home switch unit of the calling user, and indicating the home switch unit of the calling user to connect the call to the home switch unit of the called user. The home switch unit of the calling user is further used for replacing the external number of the called user in the call with the internal network number of the called user, replacing the internal network number of the calling user with the external number of the calling user, and connecting the call to the home switch unit of the called user according to the internal network number of the called user. The mapping information storing module is used for saving the mapping relation and mapping strategy between an internal network number of a user and more than one external number of the user, and determining and outputting the external number of the calling user and the internal network number of the called user to the number resolving module according to the internal network number of the calling user and the external number of the called user from the number resolving module. The home switch unit of the called user is used for receiving a call from the home switch unit of the calling user, and connecting the call to the called user according to the internal network number of the called user. The calling user number carried in the call is an external number. The called user receives a call from its home switch unit, and displaying the external number of the calling user.

In this embodiment, the calling user and the called user are both OCMN service users and require the display of the calling user number. If the calling user number does not need to be displayed, it is needless for the number resolving module to search for the external number of the calling user In this way, the home switch unit of the calling user does not need to change the external number of the calling user, the external number of the calling user does not need to be displayed to called user, and other functions of each function entity in the system is unchanged.

The above number association unit may be an SCP or an HLR, and the switch unit may be an SSP, an MSC or a switch in a fixed communication network.

As can be seen from the embodiments of the present invention, the OCMN service enables operators not to be limited by roam policies issued by the government, i.e., the operator may allow users roaming without limitation. Therefore, the implementation of the OCMN service may increase traffics greatly, and bring a high profit for operators.

In addition, the internal network number set individually may make the external number independent on an actually connected number in a call. The corresponding relation between more than one external number and the internal network number is established so as to add, delete or modify external numbers of the OCMN service user without the change of the internal network number, which only requires to reset the mapping relation between each external number and the internal network number, and makes no impact for the OCMN service.

To sum up, the foregoing are only preferred embodiments of the present invention and are not for use in limiting the protection scope thereof.

What is claimed is:

1. A method for implementing a One Card Multiple-Number (OCMN) service, comprising:
    establishing a mapping relation between an internal network number of a user and at least one external number of the user, the internal network number being used when an initiated call is processed inside a network, an external number of a calling user being used to be displayed to a called user;
    determining an internal network number of the called user corresponding to an external number of the called user according to the mapping relation when the calling user initiates a call to the external number of the called user;
    determining an external number of the calling user corresponding to an internal network number of the calling user and sending the external number of the calling user to the called user;
    connecting the call to the called user according to the internal network number of the called user;
    wherein the method further comprises setting a number association unit storing the mapping relation;
    wherein determining an internal network number of a called user and connecting the call to the called user comprises:
    triggering, by the calling user, the call to the number association unit; and
    determining, by the number association unit, the internal network number of the called user corresponding to the external number of the called user, and connecting the call to the called user;
    wherein the connecting the call to the called user comprises:
        sending, by the number association unit, the internal network number of the called user to a home switch unit of the calling user, and indicating the home switch unit of the calling user to connect the call;
        replacing, by the home switch unit of the calling user, the external number of the called user carried in the call with the internal network number of the called user, and connecting the call to a home switch unit of the internal network number of the called user according to the internal network number of the called user; and
        connecting, by the home switch unit of the internal network number of the called user, the call to the called user;
    wherein the number association unit is a Service Control Point (SCP) and the switch unit is a Service Switch Point (SSP); and
    wherein sending the external number of the calling user to the called user comprises carrying the external number of the calling user to be displayed in a parameter of an original request message and sending the original request message containing the external number of the calling user to the home SSP of the called user.

2. The method of claim 1, further comprising:
    setting a number association unit storing the mapping relation; wherein
    the determining an external network number of the calling user comprises:
    determining, by the number association unit, the external network number of the calling user corresponding to the internal network number of the calling user.

3. The method of claim 2, wherein the sending the external number of the calling user to the called user comprises:
    sending, by the number association unit, the external number of the calling user to a home switch unit of the calling user;
    replacing, by the home switch unit of the calling user, the internal network number of the calling user carried in the call with the external number of the calling user, and connecting the call carrying the external number of the calling user to the called user.

4. The method of claim 1, further comprising:
    establishing a mapping strategy for mapping an inter network number onto one of the at least one external number according to user information; wherein
    the determining an external number of the calling user comprises:
    determining, according to the mapping relation, at least one external number of the calling user corresponding to the internal network number of the calling user;
    determining the external number of the calling user corresponding to the internal network number of the calling user according to the mapping strategy.

5. The method of claim 4, wherein the user information comprises: at least one of a location of the calling user, a location of the called user and input information of the calling user.

6. The method of claim 1, further comprising:
setting a termination trigger for each external number; wherein
triggering the call to the number association unit comprises:
triggering the call to the home switch unit of the calling user;
triggering, by the home switch unit of the calling user, the call to the number association unit according to the termination trigger corresponding to the external number of the called user.

7. The method of claim 6, wherein when the internal network number of the calling user and the external number of the called user belong to different network architecture or different operators, the triggering by the home switch unit of the calling user the call to the number association unit comprises:
connecting the call to a gateway service switch unit between a home network of the external number of the called user and a home network of the internal network number of the calling user;
triggering, by the gateway service switch unit, the call to the number association unit according to the termination trigger corresponding to the external number of the called user.

8. The method of claim 6, wherein the termination trigger is one of an initial termination trigger and a number segment trigger;
the address of the termination trigger is the address of the number association unit.

9. The method of claim 1, wherein the triggering the call to the number association unit comprises:
triggering the call to a home switch unit of the calling user;
forwarding, by the switch unit of the calling user, the call to the number association unit according to a predetermined call forward number.

10. The method of claim 9, wherein the call forward number comprises a prefix and at least one external number of the called user;
the forwarding the call to the number association unit comprises:
triggering the call to the number association unit corresponding to the prefix.

11. The method of claim 10, wherein the prefix comprises:
a service key and routing information for identifying an OCMN service.

12. The method of claim 9, wherein the number association unit is one of a Service Control Point (SCP) and a Home Location Register (HLR); the home switch unit is one of a Service Switch Point (SSP), a Mobile Switch Center (MSC) and a switch of a fixed communication network.

13. The method of claim 1, wherein the internal network number is one of a number different from the at least one external number corresponding to the internal network number and one of the at least one external number corresponding to the internal network number.

14. The method of claim 9, further comprising:
when multiple external numbers are managed by different SCPs, setting a call-forward service in the home network of the multiple external numbers to forward a call to a relevant SSP, and triggering the call to an SCP as the number association unit.

15. The method of claim 10, wherein the number association unit is a SCP and the switch unit is a SSP, and the method further comprising:
if various internal network numbers belong to different SCPs, setting different prefixes respectively corresponding to different SCPs, and triggering, by the SSP, the call to the home SCP of the internal network number of the called user according to the prefix.

16. A method for implementing a One Card Multiple-Number (OCMN) service, comprising:
establishing a mapping relation between an internal network number of a user and at least one external number of the user, the internal network number being used when an initiated call is processed inside a network, an external number of a calling user being used to be displayed to a called user;
determining an internal network number of the called user corresponding to an external number of the called user according to the mapping relation when the calling user initiates a call to the external number of the called user;
determining an external number of the calling user corresponding to an internal network number of the calling user and sending the external number of the calling user to the called user; and
connecting the call to the called user according to the internal network number of the called user;
wherein the method further comprises setting a number association unit storing the mapping relation;
wherein determining an internal network number of a called user and connecting the call to the called user comprises:
triggering, by the calling user, the call to the number association unit; and
determining, by the number association unit, the internal network number of the called user corresponding to the external number of the called user, and connecting the call to the called user;
wherein the triggering the call to the number association unit comprises:
triggering the call to a home switch unit of the calling user; and
forwarding, by the switch unit of the calling user, the call to the number association unit according to a predetermined call forward number;
wherein the method further comprises:
when multiple external numbers are managed by different Service Control Points (SCPs), setting a call-forward service in the home network of the multiple external numbers to forward a call to a relevant Service Switch Point (SSP), and triggering the call to an SCP as the number association unit.

17. A method for implementing a One Card Multiple-Number (OCMN) service, comprising:
establishing a mapping relation between an internal network number of a user and at least one external number of the user, the internal network number being used when an initiated call is processed inside a network, an external number of a calling user being used to be displayed to a called user;
determining an internal network number of the called user corresponding to an external number of the called user according to the mapping relation when the calling user initiates a call to the external number of the called user;
determining an external number of the calling user corresponding to an internal network number of the calling user and sending the external number of the calling user to the called user; and connecting the call to the called user according to the internal network number of the called user;

wherein the method further comprises setting a number association unit storing the mapping relation;

wherein determining an internal network number of a called user and connecting the call to the called user comprises:
- triggering, by the calling user, the call to the number association unit; and
- determining, by the number association unit, the internal network number of the called user corresponding to the external number of the called user, and connecting the call to the called user;

wherein the triggering the call to the number association unit comprises:
- triggering the call to a home switch unit of the calling user; and
- forwarding, by the switch unit of the calling user, the call to the number association unit according to a predetermined call forward number;

wherein the call forward number comprises a prefix and at least one external number of the called user;

wherein the forwarding the call to the number association unit comprises triggering the call to the number association unit corresponding to the prefix;

wherein the number association unit is a Service Control Point (SCP) and the switch unit is a Service Switch Point (SSP), and wherein the method further comprises:
- if various internal network numbers belong to different SCPs, setting different prefixes respectively corresponding to different SCPs, and triggering, by the SSP, the call to the home SCP of the internal network number of the called user according to the prefix.

* * * * *